UNITED STATES PATENT OFFICE.

RAYMOND J. NESTELL, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR INCREASING THE SOLUBILITY OF THE POTASSIUM CONTENT OF CEMENT-KILN DUST.

1,274,310.     Specification of Letters Patent.     Patented July 30, 1918.

No Drawing.     Application filed January 15, 1917. Serial No. 142,551.

*To all whom it may concern:*

Be it known that I, RAYMOND J. NESTELL, a citizen of the United States, residing at Los Angeles, in the county of Los Angeles, State of California, have invented a new and useful Process for Increasing the Solubility of the Potassium Content of Cement-Kiln Dust, of which the following is a specification.

This invention relates to the utilization of the dust collected from the flue gas passing from cement kilns, particularly of the coal-fired type. Said dust is now being collected in large quantities by the action of electrical precipitators, and it is found to contain, in many cases, a considerable quantity of potash, making it suitable for use as a fertilizer. In some cases, the potassium content of the dust is, to a greater or less extent, in a water insoluble form and the fertilizer being generally graded and sold according to the proportion of water soluble potash, there is a serious loss to the seller of this fertilizer, for the reason that he does not get credit for all of the potassium content but only for the water soluble portion thereof. My invention is directed mainly to increasing the amount of water soluble potassium compound in material of this character so that the producer or seller of this material obtains credit for substantially the full amount of available potash contained in the dust.

I have discovered that when cement kiln dust containing more or less water insoluble potash is subjected for a sufficient time to the action of hot water, a considerable proportion of the potassium content of the material is converted into a water soluble form and my invention is based on this discovery.

My invention may be carried out as follows:

The cement kiln dust is placed in a suitable receptacle, for example, a tank into which hot water or steam is passed so as to bring the potassium compound in the dust in contact with water at or about boiling temperature. After several hours of contact of the material to be treated with the hot water in this manner, most of the potassium content of such material is converted to a water soluble form. Treatment for twenty-four hours with boiling water, will in general, be sufficient, it being of course understood that, as is usual in such cases, temperature and time are within reasonable limits mutually convertible factors; so that a similar result may be secured in longer time and at somewhat lower temperatures, or conversely, in a shorter time and at correspondingly higher temperatures. Any water remaining with the material may then be evaporated in any suitable manner so as to leave the material in suitable condition for sale and use as a fertilizer, or if desired, the water may be drawn off and evaporated down to recover the potassium compound in a more concentrated condition.

As an example of the process, cement kiln dust which contains about 13% $K_2O$, of which only about 60% was in water soluble form (as determined by extraction with cold water for two weeks), was boiled with hot water for one day, over 96% of the potash present being thereby dissolved. A small portion of the potash in the dust is not rendered soluble by this treatment, this portion being apparently that contained in unchanged rock particles carried over with the fumes and flue gases from the kiln. In fact, the potash content of cement kiln dust from coal-fired kilns may, in general, be said to exist in three forms: 1st,—a readily water soluble form, consisting apparently of potassium sulfate produced by volatilization of potassium compound in the feldspar and its precipitation in the form of sulfate by reaction with the gases in the kiln. 2nd,—a difficultly soluble form, consisting apparently of potassium compound which has reverted or become reconverted to silicate form by contact with the silicious material in the dust. This portion is particularly prominent where fire coal dust is used for fuel, the potassium compound combining with the siliceous material of the coal ash. 3rd,—an insoluble form consisting of unaltered silicate of feldspathic nature carried over with the flue gases in the form of unaltered rock particles. The present process is directed particularly to the recovery of the second constituent, the process resulting in breaking up the difficultly soluble silicate and converting it into a readily water-soluble form, which is recovered with the first named constituent so that the process provides for the recovery of substantially all of the available potash in the material.

In evaporating the solution to dryness, for the recovery of potassium compound therefrom, I prefer to utilize the heat of the flue or kiln gases from the cement kilns, said gases being passed under or over or through evaporating tanks or pans, or utilized in any other manner in order to evaporate the solution by the heat of said gases.

What I claim is:

1. The process of converting to soluble form the potassium compound present in cement kiln dust in difficultly soluble form, which consists in subjecting such dust to the action of water at approximately 100° C. for a sufficient time to effect substantial conversion of such compound to a form which is readily soluble in water.

2. The process of recovering from coal-fired cement kiln dust potassium compound present therein in difficultly soluble form, which consists in subjecting such dust to the action of water at approximately 100° C. for a sufficient time to effect substantial conversion of such compound to a form which is readily soluble in water, removing the resulting solution from the undissolved residue and treating said solution to obtain the potassium compound therein in concentrated form.

3. The process of recovering from coal-fired cement kiln dust potassium compound present therein in difficultly soluble form, which consists in subjecting such dust to the action of water at approximately 100° C. for a sufficient time to effect substantial conversion of such compound to a form which is readily soluble in water, removing the resulting solution from the undissolved residue and evaporating said solution to dryness.

4. The process of treating flue dust from coal-fired cement kilns, to increase the solubility of difficultly soluble potassium compound therein, which consists in subjecting such dust to the action of hot water at a temperature and for a time sufficient to effect substantial conversion of such difficultly soluble compound to a compound which is readily soluble in water.

In testimony whereof I have hereunto set my hand, at Los Angeles, California, this 5th day of January 1917.

RAYMOND J. NESTELL.

Copies of this patent may be obtained for five cents each, by addressing the "Commissioner of Patents, Washington, D. C."